United States Patent
Brouckaert et al.

(10) Patent No.: US 12,421,739 B2
(45) Date of Patent: Sep. 23, 2025

(54) COATED PANEL, METHOD FOR MANUFACTURING THEREOF AND MILLING TOOL APPLIED THEREWITH

(71) Applicant: FLOORING INDUSTRIES LIMITED, SARL, Bertrange (LU)

(72) Inventors: Dries Brouckaert, Gullegem (BE); Christophe Naeyaert, Jabbeke (BE); Bryan Rollier, Kanegem (BE)

(73) Assignee: UNILIN BV, Wielsbeke (BE)

( * ) Notice: Subject to any disclaimer, the term of this patent is extended or adjusted under 35 U.S.C. 154(b) by 246 days.

(21) Appl. No.: 18/016,234

(22) PCT Filed: Jun. 16, 2021

(86) PCT No.: PCT/IB2021/055329
§ 371 (c)(1),
(2) Date: Jan. 13, 2023

(87) PCT Pub. No.: WO2022/013645
PCT Pub. Date: Jan. 20, 2022

(65) Prior Publication Data
US 2023/0258004 A1    Aug. 17, 2023

(30) Foreign Application Priority Data

Jul. 17, 2020   (BE) .................................. 2020/5539

(51) Int. Cl.
*E04F 15/10* (2006.01)
*B44C 5/04* (2006.01)
*E04F 15/02* (2006.01)

(52) U.S. Cl.
CPC .............. *E04F 15/105* (2013.01); *B44C 5/04* (2013.01); *E04F 15/02033* (2013.01); *E04F 15/02038* (2013.01); *E04F 2201/0161* (2013.01)

(58) Field of Classification Search
CPC .............. E04F 15/105; E04F 15/02033; E04F 2201/0161; E04F 15/02016;
(Continued)

(56) References Cited

U.S. PATENT DOCUMENTS 9,745,756 B2    8/2017  Hannig
11,002,020 B2   5/2021  Hannig
(Continued)

FOREIGN PATENT DOCUMENTS

CN    102605926 A    7/2012
CN    102985627 A    3/2013
(Continued)

OTHER PUBLICATIONS

Kirchberger (WO 2007/101281 A1); Sep. 13, 2007 (EPO machine translation to English). (Year: 2007).*
(Continued)

*Primary Examiner* — Donald M Flores, Jr.
(74) *Attorney, Agent, or Firm* — Workman Nydegger

(57) ABSTRACT

A coated panel with a substrate and a decorative top layer, such that the decorative top layer includes a print and a transparent wearing layer applied thereon. The panel has a lowered edge region at least on one edge. Both the aforementioned print and the aforementioned wearing layer extend continuously from on the central area of the panel over the aforementioned lowered edge region. The aforementioned wearing layer has a lower degree of gloss at the location of the lowered edge region than on the central area of the aforementioned coated panel and/or has a degree of gloss of 10 or less measured according to DIN 67530. A method for manufacturing is provided for the coated panel and to a milling tool applied therewith.

19 Claims, 3 Drawing Sheets

(58) Field of Classification Search
CPC ...... E04F 2201/0146; E04F 2201/0153; B44C 5/04; B32B 2307/4023; B32B 2307/554; B32B 2419/04; B32B 3/06; B32B 27/08; B32B 27/20; B32B 27/304; B27M 3/04; Y10T 428/24008; Y10T 428/24355; Y10T 428/24364; Y10T 428/24438; Y10T 428/24479

See application file for complete search history.

(56) References Cited

U.S. PATENT DOCUMENTS

| | | | |
|---|---|---|---|
| 2008/0138560 | A1 | 6/2008 | Windmoller |
| 2011/0138722 | A1 | 6/2011 | Hannig |
| 2017/0335571 | A1 | 11/2017 | Hannig |
| 2018/0195291 | A1 | 7/2018 | Loncke et al. |
| 2018/0339504 | A1 | 11/2018 | Ziegler et al. |

FOREIGN PATENT DOCUMENTS

| | | | | |
|---|---|---|---|---|
| CN | 110621500 | A | 12/2019 | |
| DE | 102012112562 | A1 * | 6/2014 | ........ E04F 15/02038 |
| DE | 102013113478 | A1 * | 6/2015 | ............. B32B 13/14 |
| EP | 1026341 | A2 | 8/2000 | |
| EP | 1522653 | A1 * | 4/2005 | ............. E04F 15/02 |
| EP | 1938963 | A1 | 7/2008 | |
| EP | 2050582 | A1 | 4/2009 | |
| EP | 2763850 | A2 | 8/2014 | |
| EP | 2883712 | A1 | 6/2015 | |
| WO | 97/47834 | A1 | 12/1997 | |
| WO | 2006066776 | A2 | 6/2006 | |
| WO | WO-2007101281 | A1 * | 9/2007 | ............. B23C 3/06 |
| WO | 2009124704 | A1 | 10/2009 | |
| WO | 2010023042 | A1 | 3/2010 | |
| WO | 2012004701 | A2 | 1/2012 | |
| WO | WO-2017001976 | A1 * | 1/2017 | ............. B32B 21/02 |

OTHER PUBLICATIONS

Schulte (DE 10 2012 112562 A1); Jun. 18, 2014 (EPO machine translation to English). (Year: 2014).*
Schulte (DE 10 2013 113478 A1); Jun. 11, 2015 (EPO machine translation to English). (Year: 2015).*
Lewark (EP 1522653 A1); Apr. 13, 2005 (EPO machine translation to English). (Year: 2005).*
Belgian Search Report from corresponding Belgian Application No. BE202005539, Mar. 31, 2021.
International Search Report from corresponding PCT Application No. PCT/IB2021/055329, Oct. 29, 2021.

* cited by examiner

COATED PANEL, METHOD FOR MANUFACTURING THEREOF AND MILLING TOOL APPLIED THEREWITH

BACKGROUND

The present invention relates to a coated panel, as well as to a method for the manufacture thereof, a milling tool used therein, and a method for manufacturing these milling tools.

In particular, the invention relates to coated panels with a substrate and a decorative top layer, wherein the decorative top layer comprises a print and a transparent top layer applied thereon. Such panels are widely known, for example from WO 97/47834, WO 2006/066776, WO 2010/023042 and WO 2012/004701 and may for example imitate parquet panels or stone or ceramic tiles. It is known from WO 97/47834 to provide such panels with coupling means, so that a floating floor covering may be assembled on the basis of such panels.

It is known from WO 2012/004701 to use a thermoplastic layer, for example of PVC, as a wearing layer. It is also known from this document to remove a portion of the top layer on the edge of the panel for forming a lowered edge region in the form of a chamfer that extends up to the level of the print. Said chamfer may then be provided with a separate decorative covering. Said chamfer may come across as false and adversely affect the otherwise good imitation in the upper surface of the panel.

It is known from WO 2006/066776 to produce a chamfer by deforming the substrate, wherein the print and the wearing layer, in this case for example a thermosetting wearing layer, extend continuously from the central upper surface of the panels over the aforementioned chamfer. Said chamfer is complex to produce.

SUMMARY

The present invention relates in the first place to an alternative coated panel, wherein according to various preferred embodiments, a solution is offered for the problems with the coated panels from the prior art.

For this purpose, the present invention relates, according to a first independent aspect, to a coated panel with a substrate and a decorative top layer, wherein the aforementioned decorative top layer comprises a print and a transparent wearing layer applied thereon, wherein the aforementioned panel has a lowered edge region at least on one edge, wherein both the aforementioned print and the aforementioned wearing layer extend continuously from on the central area of the panel over the aforementioned lowered edge region, with the distinctive feature that the aforementioned wearing layer has, at the location of the lowered edge region, a lower degree of gloss than on the central area of the aforementioned coated panel, or at least a degree of gloss that is lower than an immediately adjacent portion of the surface of the panel, and/or with the distinctive feature that the aforementioned wearing layer has, at the location of the lowered edge region, a degree of gloss of 10 or less, measured according to DIN 67530. The inventors have established that the use of a lower degree of gloss on the surface of the lowered edge region produces an additional depth effect, so that the lowered edge region appears to extend more deeply than is actually the case. Preferably, the aforementioned lower degree of gloss, in comparison with the central area, or compared to an immediately adjacent portion of the surface, is present over at least 50% of the length of the edge in question, and better still over the entire length or substantially the entire length of the edge in question.

It is not excluded that the central area itself has several degrees of gloss. In such a case it is important that the degree of gloss of the lowered edge region is lower than the degree of gloss of an immediately adjacent portion of the upper surface of the floor panel, and preferably over the major part of the length of the edge in question.

Preferably the edge region in question has in itself a uniform degree of gloss over the entire length of the edge in question, or almost over the entire length of the edge in question. Preferably the edge region in question has a degree of gloss of 10 or less, measured according to DIN 67530.

Preferably the central area has, over the major part of its surface, a degree of gloss of 15 or more, or even 20 or more. According to a variant, the edge region in the invention may also be employed for panels whose central area has a low degree of gloss, for example of 10 or less. According to the invention, the edge region then has a degree of gloss that is in conformity with or practically in conformity with the degree of gloss of the central area, and an artificial appearance at the location of the edge region is avoided. This variant is mainly of interest in cases when the aforementioned transparent wearing layer on the surface thereof is of matt finish, for example because this transparent wearing layer itself has, on the surface in question, a surface layer or coating with a low degree of gloss, for example with a degree of gloss of 10 or less. Said surface layer or coating may have a thickness from 5 to 20 μm and may for example be obtained on the basis of a radiation-cured coating material. In particular, it may be a coating that is at least cured on the basis of excimer radiation under inert atmosphere. Said curing in fact makes it possible to adjust the degree of gloss, and matt surfaces are easily attainable. During production of the lowered edge region, for example by means of a cutting process, the surface layer or coating is, however, removed at the location of the edge region, and a higher degree of gloss may arise there, namely the degree of gloss of the actual transparent wearing layer. This may seem synthetic and disturbing, and is avoided on the basis of the present invention. Preferably the central area and the lowered edge region have, in the case of the variant, a comparable surface roughness, for example a surface roughness expressed in micrometers Ra that differs less than 0.5, or even less than 0.2 μm. Preferably the roughness of the central area is formed on the basis of the material of the surface layer or coating, whereas the roughness of the lowered edge region is formed by the material of the actual transparent wearing layer, which for example consists mainly of a thermoplastic, such as polyvinyl chloride.

According to the most preferred embodiment, a lowered edge region with a lower degree of gloss is present on at least two opposite edges of the coated panel. In the case of a elongated rectangular coated panel, this preferably applies to the pair of long edges. It is of course not excluded that such a lowered edge region would be applied on all edges of a rectangular panel. In the case of an elongated rectangular panel the degree of gloss of the lowered edge region on the pair of long edges is preferably lower than the degree of gloss of the lowered edge region on the pair of short edges, so that the lowered edge region on the pair of long edges gives the impression of being deeper than the lowered edge region on the pair of short edges. It is also possible that on one pair of edges, for example the pair of long edges, a lowered edge region is applied with the distinctive features of the invention, whereas on the other pair of edges, for example the pair of short edges, a lowered edge region is applied whose degree of gloss does not necessarily satisfy the distinctive features of the first aspect.

The difference in degree of gloss between the lowered edge region and the central upper surface, or a portion of the upper surface located immediately adjacent to the lowered edge region, is preferably at least 1 point as measured in accordance with DIN 67530. Better still, the difference is 5 points or more.

Preferably the aforementioned lower degree of gloss is obtained because the aforementioned wearing layer has a rougher surface structure at the location of the aforementioned lowered edge region than at the location of the overall surface and/or because the aforementioned wearing layer is compressed at the location of the aforementioned lowered edge region. Thus, the lower degree of gloss may be obtained on the basis of mechanical processing of the surface of the lowered edge region, rather than by local addition of a chemical matting agent.

Preferably the aforementioned lowered edge region is a chamfer. Preferably the aforementioned chamfer makes an angle with the upper surface or the horizontal of less than 25°, or better still of 15° or less. A good value for this is 11°. Preferably said chamfer extends over a distance measured in the area of the panel of less than 2.5 mm. The actual respective depth is thus limited, in particular preferably less than 1.15 mm, better still less than 0.67 mm or less than 0.5 mm.

According to the most preferred embodiment, the chamfer extends over a depth that is less than the thickness of the wearing layer at the location of the central area.

Preferably the aforementioned wearing layer has, at the location of the central area, a thickness of 0.3 mm or more, but preferably less than 0.75 mm.

Preferably the aforementioned wearing layer consists mainly of a thermoplastic, such as polyvinyl chloride, PVC. The use of a thermoplastic on the surface is desirable for minimizing tapping noises when using said panel as a floor panel, or for minimizing scratching noises when using said panel as a furniture panel or wall panel. Production of a lowered edge region in a thermoplastic top layer, in particular in the case of PVC, gives rise in the prior art to a glossy zone along the edge where the lowered edge region is applied. It is firstly in the case of coated panels of this kind that the invention aims to offer a solution for the unnatural appearance that said glossy edge region imparts to the panel. Preferably the layer of thermoplastic in question is free from solid additives such as ceramic particles for example of aluminum oxide, or it contains less than 3 grams per square meter of such particles. They may be omitted with a view to obtaining good transparency, while nevertheless maintaining an acceptable wear resistance, namely a wear resistance comparable to or better than that of a laminate panel in the AC2 or AC3 class, measured according to EN 13329. The wearing layer preferably has a thickness of at least 0.3 mm, but preferably less than 0.75 mm, wherein 0.3 to 0.55 mm is a good value. With this good value, it is already possible, on the basis of the thermoplastic material of the wearing layer alone, thus without taking any solid additives into account, to obtain an adequate wear resistance for residential applications. Thus, for example it is possible to get an IP (initial wear point) value of 3000 or more in the Taber tests, as described in EN 13329, annex E. Optionally, a surface layer, for example based on a radiation-cured polyurethane or acrylate compound, may also be present on the surface of the layer of thermoplastic. Said surface layer preferably has a thickness of 100 μm or less, or even of 50 μm or less. Said surface layer may optionally comprise aluminum oxide particles or other hard particles, preferably with an average particle size of 10 μm or less, or even of 3 μm or less, as measured on the basis of laser scattering granulometry in accordance with ISO 13320, namely by means of a dynamic light scattering technique wherein a laser is used with an emission at 632.8 nm and measured at a scattering angle of 90°. Laser scattering granulometry may for example be carried out by means of a Malvern® Mastersizer 2000 or with a Malvern® Mastersizer 3000. The aforementioned surface layer may have a low degree of gloss. This may in particular be realized on the basis of a surface layer that is cured by means of excimer light in an inert atmosphere, for example of nitrogen. Based on the settings of the light and the atmosphere, a surface may be produced with microscopic wrinkles, so that a matt appearance is obtained.

Preferably the aforementioned print is located on a thermoplastic carrier film, and it forms together with the film, for example a printed PVC film, PU film, PP film or PET film. In the case of a PP film, it may be for example an oriented polypropylene film. In the case of a PVC film it is preferably a rigid PVC film, namely a film based on PVC without plasticizer or with a proportion of plasticizer of less than 5 phr (parts per hundred of resin). A rigid PVC film of this kind can be printed with a higher accuracy, especially when it is printing carried out with water-based inks. In such a case a drying operation based on heat supply is desirable in the printing process, but owing to the choice of rigid PVC the possible expansion of the film is limited. As mentioned above, the wearing layer preferably also comprises a thermoplastic material, such as flexible or rigid PVC, PU, PP or PET. In the case of a PVC wearing layer, this preferably comprises a proportion of plasticizer of more than 5 phr, or even more than 10 or 15 phr.

According to an alternative, it is not excluded that the print could be applied on the underside of the wearing layer. According to another alternative, the print is formed directly on the substrate, by means of printing that is carried out on the substrate, preferably subject to interposition of one or more priming coats.

Preferably the surface of the aforementioned lowered edge region is formed essentially by the material of the aforementioned wearing layer, optionally with the exception of the aforementioned surface layer. In this way a similar wear resistance may be obtained over the whole area of the coated panel. The absence of the surface layer on the lowered edge region may give rise to a striking visual difference between the lowered edge region and the central area of the coated panel. This is particularly so in the case when the surface layer is matt, for example because it has a structure of microscopic wrinkles, for example obtained on the basis of an excimer-cured layer, as stated above. It is in particular for coated panels of this kind that the present invention offers a solution.

Preferably the aforementioned print extends at the location of the aforementioned lowered edge region in one and the same plane as at the location of the central area. Thus, the substrate is preferably not deformed at the location of the lowered edge region. Nevertheless, the impression may be created that the edge region is obtained in the same manner as in the case of the WO 2006/066776, namely by deforming the substrate, since the lower degree of gloss of the edge region creates an additional depth effect.

Preferably the aforementioned substrate comprises plastic and/or fillers, or it consists mainly of plastic and/or fillers. The plastic is preferably polyvinyl chloride (PVC), but may on the other hand also be selected from the list of polypropylene (PP), polyurethane (PU), polyethylene (PE) and polyethylene terephthalate (PET). According to an alternative, the aforementioned substrate may be mineral-based and/or be obtained on the basis of a hydraulically curing binder, such as lime-based or magnesium-based cement, for example based on Portland Cement, Sorel's Cement or MgO (magnesium oxide). Said substrate preferably further comprises fibers or particles, such as wood fibers or wood particles, cellulose fibers, glass fibers, plastic fibers such as PVA fibers (polyvinyl alcohol). According to another alternative the substrate consists of a wood-based or grass-based substrate, such as a MDF or HDF board (Medium or High Density Fiberboard), a wood chipboard, a bamboo-based board, a hemp-based board. According to another alternative, the substrate consists of a compact laminate, namely a board that comprises several carrier films pressed on top of one another and provided with resin. It may be for example paper or card sheets that are impregnated with phenol formaldehyde, melamine formaldehyde, urea formaldehyde, or combinations thereof. Such a substrate is for example known per se from EP 2 763 850.

Firstly, the invention is intended to be used for coated panels that are provided on at least two opposite edges with coupling means that allow two such panels to be coupled together on the respective edges, wherein locking is obtained both in a vertical direction perpendicular to the plane of the coupled panels, and in a horizontal direction perpendicular to the respective edges in the plane of the coupled panels. With such panels, after installation there is a risk of gap formation between the coupled edges through changes in the climate of the environment, for example changing temperature or air humidity. A lowered edge region may be used for masking such gaps. The inventors have established that masking is more effective with matt-finished lowered edge regions.

Preferably the aforementioned coupling means are formed substantially as a male coupling part, for example a tongue, and a female coupling part, for example a groove, wherein in the coupled state, horizontally acting locking surfaces are formed, which counteract moving apart of the coupled floor panels. They may be coupling means that can be fitted into each other by means of a rolling motion round the respective edges. According to a particular embodiment they are coupling means that can be fitted into each other by means of a downward motion. With these coupling means, during installation there is a risk of so-called "peaking". This is a phenomenon wherein the male coupling part is either deformed plastically, or insufficiently coupled with the female coupling part, so that the male coupling part bends away slightly from the panel surface. The outward bending, no matter how minuscule, may readily be noticed and perceived as an annoying defect. This is particularly so with incidence of light that is almost parallel to the surface. The presence of a lowered edge region with the distinctive features of the invention also offers solace here.

According to a particular embodiment, the aforementioned substrate comprises several layers, wherein a first layer with a first hardness is located between the aforementioned print and a second layer with a second hardness that is greater than the aforementioned first hardness. Said first layer may impart particular properties to the coated panel and/or in manufacture. Thus, for example additional damping of tapping noises is obtained and deeper structural features may be provided in the surface of the panel. The difference in hardness is preferably at least 10 on the Shore A hardness scale. The aforementioned second layer then preferably has a hardness of 80 Shore A or more. The different hardness in the aforementioned layers may for example be achieved because both the first layer and the second layer contain polyvinyl chloride, wherein the plasticizer content in the aforementioned first layer is higher than in the aforementioned second layer. Preferably there is a difference of at least 5 phr between the respective layers. Preferably, in the coupled state of two such panels, a contact surface arises directly under the join of the respective upper surfaces of the coupled panels, wherein this contact surface is formed substantially, or even exclusively, on the material of the aforementioned first layer of both coupled panels and optionally on the layers of the decorative top layer located above. The inventors have noticed that with this geometry of the joint of the upper surfaces there is a reduced tendency for peaking or outward bending of the upper edges in consequence of dimensional changes after installation, and/or in consequence of the application of so-called pretension. The residual tendency for this is masked sufficiently by employing a lowered edge according to the invention. Pretension as stated above is achieved by providing an overlap in the contours of the male and female coupling parts, so that a light drive fit arises. Preferably the overlap is located at least, and preferably essentially, at the location of the aforementioned horizontally acting locking surfaces. As a result, preferably an outward bending develops on the underside of the panel, for example on the side with the female coupling part or the groove. Then, in an attempt to return to its state of rest, the outward-bent portion presses the male coupling part toward the female coupling part. As a result, a tension preferably arises on the aforementioned contact surface under the joint of the upper surfaces of the coupled panels. This tension will lead to peaking to a reduced extent in consequence of the formation of the contact surface on the aforementioned first layer.

It is clear that the effects as have been described above may also be achieved when a coating, for example with a water-repellent substance, is present on one or both contact surfaces. Preferably in such a case it relates to a coating of limited thickness, preferably less than 0.1 mm thick, or even less than 0.01 mm thick. It may for example be a coating with the water-repellent substance that is described in more detail hereunder. In the context of the present invention, in such an embodiment the contact surface is still seen as formed on the first layer and optionally the layers of the decorative top layer located above.

Preferably the substrate comprises one or more glass fiber layers. In this way dimensional changes of the panel can be limited overall. Any deformation in consequence of dimensional changes that nevertheless occurs may then largely be limited by means of the contact surface on the aforementioned first layer.

Preferably, the aforementioned horizontally acting locking surfaces are formed mainly, or even exclusively, on the material of the aforementioned second layer. In this way, strong locking in the horizontal direction can be guaranteed.

Preferably, at least one portion of the surface of the aforementioned coupling means is provided with a water-repellent substance. Because a water-repellent substance is used, the applied pretension may be limited, yet a sufficiently waterproof result of the joint between the coupled panels is achieved. This possibility results in a reduced tendency to outward bending of the coupled upper edges. Preferably the aforementioned water-repellent substance is provided directly under the join of the upper surfaces of the coupled panels, or at the very least in a position above the actual coupling means, namely at a level above the aforementioned horizontal locking surfaces, and preferably also above the level of any vertically acting locking surfaces.

A fluoro copolymer is preferably used as the aforementioned water-repellent substance.

The aforementioned coupling means may have one or a combination of two or more of the following properties:
- the property that the mechanical coupling means or coupling parts are mainly formed as a tongue and a groove delimited by an upper lip and a lower lip, wherein said tongue and groove are mainly responsible for locking in the aforementioned vertical direction, and wherein the tongue and the groove of secondary locking elements, mainly responsible for locking in the aforementioned horizontal direction, are provided. Preferably the locking elements comprise a projection on the underside of the tongue and a recess in the lower groove lip. Such coupling means and locking elements are known for example from WO 97/47834;
- the property that the mechanical coupling means or coupling parts press the coupled floor panels against each other, for example because these mechanical coupling means are made with so-called pretension, such as is known per se from EP 1 026 341. The tensile force with which the floor panels are pressed against each other or toward each other may for example, in combination with the above property, be obtained on the basis of a lower lip, or another portion of a female coupling part, bent outwards in the coupled position, which in an attempt to spring back, presses against the underside of the tongue or male coupling part;
- the property that the mechanical coupling means allow coupling on the basis of a horizontal, or almost horizontal, sliding movement of the panels toward each other;
- the property that the mechanical coupling means allow coupling on the basis of a rolling motion along the respective edges;
- the property that the mechanical coupling means allow coupling on the basis of a downward-directed motion of a male coupling part, for example with a tongue, into a female coupling part, for example with a groove. As stated, with panels of this type there is a risk of peaking;
- the property that the mechanical coupling means, or at least the associated upper edge, is produced on the basis of a milling operation with rotating milling tools.

It is clear that the coated panel of the invention according to the most preferred embodiment is a floor panel for forming a floating floor covering. However, it is not excluded that the invention may find application for wall panels, ceiling panels or furniture panels.

Furthermore, it is clear that the aforementioned measures that prevent or limit the effect of peaking on the upper surface of the panel may also be employed independently of the characterizing lowered edge region of the first aspect. It is therefore clear that the present invention also relates, according to an especially independent aspect, to a coated panel, preferably a floor panel, with a substrate and a decorative top layer, wherein the coated panel is provided on at least two opposite edges with coupling means that allow two such panels to be coupled together on the respective edges, wherein locking is obtained both in a vertical direction perpendicular to the plane of the coupled panels, and in a horizontal direction perpendicular to the respective edges and in the plane of the coupled panels, characterized in that the floor panel further has one or a combination of two or more of the following properties:
- the property that the panel is rectangular, wherein the panel is provided with coupling means both on the pair of long edges and on the pair of short edges, wherein the coupling means on the pair of long edges allow two such panels to be coupled together by means of a rolling motion, and the coupling means on the pair of short edges preferably allow two such panels to be coupled together by means of a downward motion;
- the property that the mechanical coupling means or coupling parts press the coupled floor panels against each other at least on the pair of long edges, and preferably also on the pair of short edges;
- the property that, at least on the pair of long edges, and preferably also on the pair of short edges, a contact surface is formed directly under the position where the upper surfaces of the coupled panels abut against each other and that this contact surface is preferably formed on a first layer of the substrate that is more flexible than a second layer located thereunder;
- the property that, at least on the pair of long edges, and preferably also on the pair of short edges, a contact surface is formed directly under the position where the upper surfaces of the coupled panels abut against each other and that this contact surface is preferably formed on a first layer of the substrate that comprises a higher proportion of plasticizer than a second layer located thereunder, wherein both layers comprise PVC;
- the property that at least one portion of the coupling means, at least on the pair of long edges, and preferably also on the pair of short edges, is provided with a water-repellent substance;
- the property that the aforementioned decorative top layer comprises a print and a thermoplastic wearing layer applied thereon.

According to the most preferred embodiment of the above particular independent aspect, the panel is a floor panel with a substrate and a decorative top layer, wherein the coated panel is provided on at least two opposite edges with coupling means that allow two such panels to be coupled together on the respective edges, wherein locking is obtained both in a vertical direction perpendicular to the plane of the coupled panels, and in a horizontal direction perpendicular to the respective edges and in the plane of the coupled panels, wherein the floor panel further has at least the following combination of properties:
- the property that the mechanical coupling means or coupling parts press the coupled floor panels against each other at least on the pair of long edges, and preferably also on the pair of short edges;
- the property that a contact surface is formed directly under the position where the upper surfaces of the coupled panels abut against each other and that this contact surface is formed substantially, and preferably exclusively, on a first layer of the substrate and the decorative top layer located above that, wherein the aforementioned first layer is more flexible than the second layer of the substrate located thereunder, wherein both the first layer and the second layer comprise PVC and the aforementioned first layer of the substrate comprises a higher proportion of plasticizer than the second layer located thereunder;
- the property that at least one portion of the coupling means is provided with a water-repellent substance;
- the property that the aforementioned decorative top layer comprises a print and a thermoplastic wearing layer applied thereon.

Although long and short edges are mentioned above, it is clear that the invention may also be applied, according to all its aspects, to square panels.

With the same aim as in the first independent aspect, the present invention further relates, according to its second independent aspect, to a method for manufacturing a coated panel, which preferably has the distinctive features of the first aspect and optionally one or more preferred embodiments thereof, with the distinctive feature that the method comprises the step of forming the aforementioned lowered edge region by removing a portion of the aforementioned wearing layer on the respective edge. Preferably, the portion in question is removed on the basis of a cutting process with a rotating milling tool. Said milling tool preferably comprises one or more cutting sections with a rake surface and a flank surface, which are joined to each other by a cutting edge, which is provided as a ridge between the rake surface and the flank surface, and wherein the radius of the cutting edge is between 2 and 50 µm, wherein the wedge angle between the rake surface and the flank surface is preferably less than 80°. According to the most preferred embodiment, the wedge angle between the rake surface and the flank surface is between 60 and 75° and/or the radius of the cutting edge is between 5 and 22 µm. The inventors have established that said relatively blunt milling tool may, during cutting, leave a rough and lightly compressed surface of the wearing layer. As a result, a degree of gloss may be obtained on the surface of the lowered edge region of 10 or less, measured according to DIN 67530.

Preferably the aforementioned cutting sections consist of polycrystalline diamond (PCD), and are preferably provided on a hard-metal carrier. The tool may comprise several similar or identical cutting sections, preferably distributed uniformly over the circumference of the rotating cutting tool.

It is clear that the present invention also relates independently to a milling tool for carrying out a method, for example with the distinctive feature that the rake angle is preferably between 5 and 12° and/or the clearance angle is preferably between 0 and 15°, better still between 0 and 5°.

According to a third independent aspect, the present invention further relates to a method for manufacturing a milling tool, with the distinctive feature that the method comprises at least the following steps:
- the step of providing a cutting section with a rake surface and a flank surface, which are joined to each other by a cutting edge, which is provided as a ridge between the rake surface and the flank surface, wherein the wedge angle between the rake surface and the flank surface preferably is less than 80° or is between 60 and 75°;
- the step of processing the cutting section with an abrasive medium, wherein the cutting edge is preferably provided with a radius between 2 and 50 µm.

Preferably the aforementioned cutting section is provided with the rake surface and the flank surface by means of spark erosion, but specifically by means of wire spark erosion.

Preferably the step of processing the cutting section comprises immersing it in a bath filled with the aforementioned abrasive medium, wherein preferably a vibrating motion is performed with the bath.

Preferably the aforementioned abrasive medium comprises abrasive grains, preferably of aluminum oxide or diamond.

Preferably, in the processing step, the aforementioned cutting section performs a rotating motion in the aforementioned abrasive medium.

According to an alternative, or in combination with the processing in a bath, the processing step may comprise brushing of the cutting section, based on a brush provided with bristles coated with abrasive particles. Preferably the aforementioned brush performs a rotating motion.

For better illustration of the distinctive features of the invention, some preferred embodiments are described hereunder, as examples without any limiting character, referring to the appended drawings, in which:

DETAILED DESCRIPTION OF VARIOUS EMBODIMENTS

Figure 1:
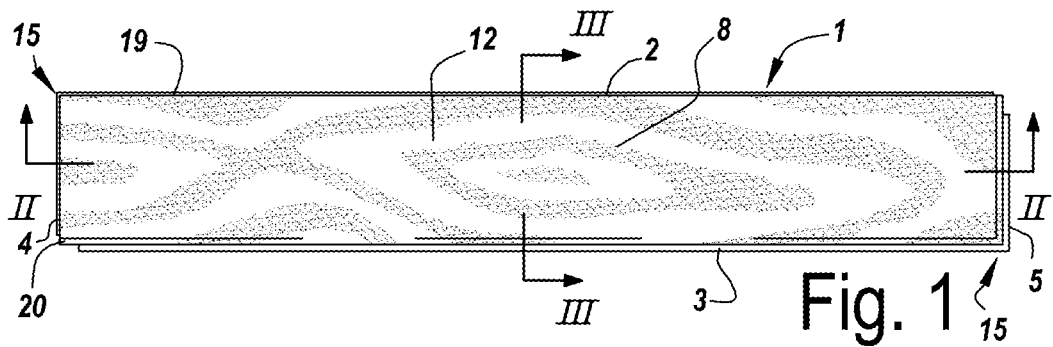
FIG. 1 shows a coated panel with the distinctive features of the invention.

FIG. 1 shows a rectangular, elongated coated panel 1, in this case a floor panel with a pair of long opposite edges 2-3 and a pair of short opposite edges 4-5.

Figure 2:
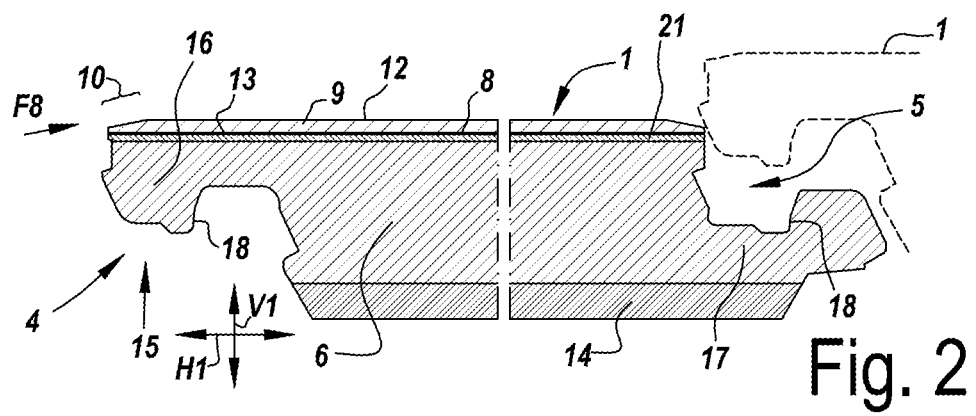
FIGS. 2 and 3 show, on a larger scale, a cross section along lines II-II and shown in FIG. 1.
Figure 3:
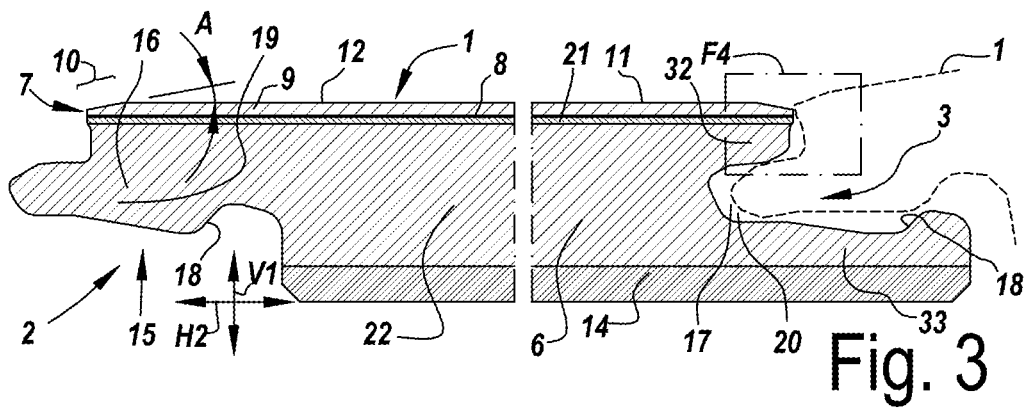

FIGS. 2 and 3 show that panel 1 comprises a substrate 6 and a decorative top layer 7, wherein the decorative top layer 7 comprises a print 8 and a transparent wearing layer 9 applied thereon.

The panel 1 has at least one edge, and in this case, on both edges of both the pair of short opposite edges 4-5 and the pair of long opposite edges 2-3, a lowered edge region 10. In this case, the lowered edge region 10 is a chamfer that makes an angle A with the horizontal of less than 25°, in this case about 11°.

Figure 4:
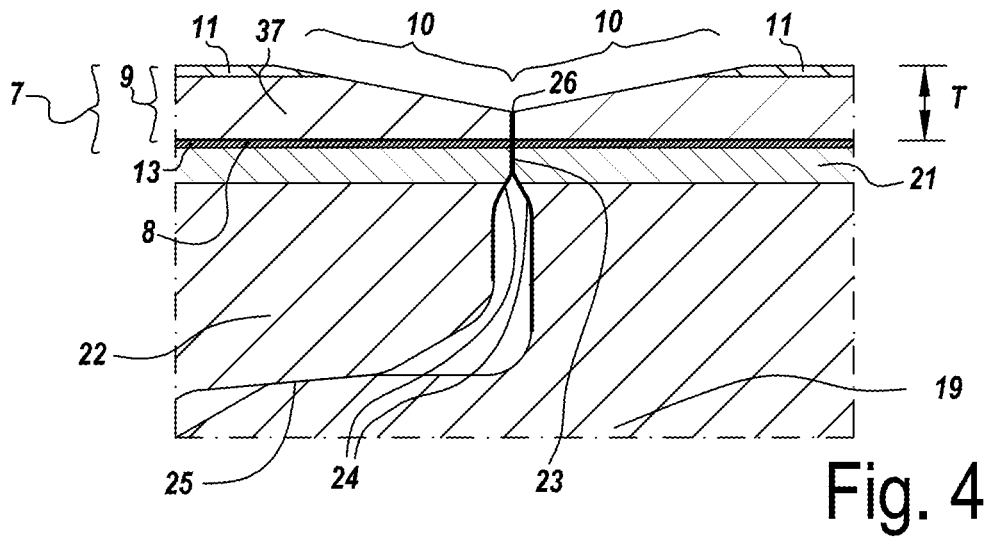
FIG. 4 shows, on a larger scale, a view of the region that is marked as F4 in FIG. 3.

FIG. 4 shows that the wearing layer 9 has a thickness T of at least 0.3 mm, in this case about 0.55 mm. The wearing layer 9 consists mainly of thermoplastic, in this case polyvinyl chloride, and has on the surface a surface layer 11, for example based on a radiation-cured polyurethane or acrylate compound.

Both the print 8 and the aforementioned wearing layer 9 extend continuously from on the central area 12 of the panel 1 over the lowered edge regions 10, and the surface of the aforementioned lowered edge region is essentially formed by the aforementioned wearing layer 9, except for the aforementioned surface layer 11. The print 8 extends at the location of the lowered edge region 10 in one and the same plane as at the location of the central area 12. At the location of the lowered edge region 10, the wearing layer 9 has a degree of gloss of 10 or less, measured according to DIN 67530. The degree of gloss at the location of the lowered edge region 10 may be lower than or equal to that of the central area 12. The low degree of gloss is obtained because the aforementioned wearing layer 9 has a rough surface structure at the location of the lowered edge region 10 and/or because the aforementioned wearing layer 9 is compressed at this place.

In the example, the print 8 is applied on a thermoplastic carrier film 13 and the substrate 6 consists mainly of plastic and/or fillers, such as PVC and calcium carbonate. A, preferably foamed, layer 14, for example based on cross-linked polyethylene, is applied on the underside of the substrate 6, for the purpose of sound damping and/or accommodation of irregularities of the substrate.

FIGS. 2 and 3 clearly show that the floor panel 1 is provided on both pairs of opposite edges 2-3; 4-5 with coupling means 15 that allow two such panels 1 to be coupled together on the respective edges 2-3; 4-5. In the coupled state, locking is produced both in a vertical direction V1 perpendicular to the plane of the coupled floor panels 1, and in a horizontal direction H1-H2 perpendicular to the respective edges 2-3; 4-5 and in the plane of the coupled panels 1. The coupling means 15 are in each case configured as a male coupling part 16 and a female coupling part 17, wherein in the coupled state, horizontally acting locking surfaces 18 are formed, which counteract movement of the coupled floor panels 1 away from each other in the horizontal direction. On the pair of long opposite edges 2-3, the male coupling part 16 is formed by a sideways projecting tongue 19, and the female coupling part by a groove 20.

As shown, the substrate 6 comprises several layers 21-22, wherein a first layer 21 with a first hardness is located between the aforementioned print 8 and a second layer 22 with a second hardness that is greater than the aforementioned first hardness. Both the first layer 21 and the second layer 22 comprise polyvinyl chloride. The plasticizer content in the aforementioned first layer 21 is higher than in the aforementioned second layer 22. In the coupled state of two such panels 1, a contact surface 23 is formed directly under the join of the respective upper surfaces, wherein this contact surface 23 is formed exclusively on the aforementioned first layer 21 and the layers 8-9 of the decorative top layer 7 located above, namely in particular at least on the first layer 21, and the wearing layer 9, except the surface layer 11. The aforementioned horizontally acting locking surfaces 18 are formed exclusively on the material of the aforementioned second layer 22.

FIG. 4 shows further that at least one portion of the surface of the coupling means 15 is provided with a water-repellent substance 24. Preferably the water-repellent substance is at least provided directly under the join of the upper surfaces of the coupled panels 1, namely in a position above the actual coupling means 15, namely, in the case of the long opposite edges 2-3, above the engagement of the tongue 19 in the groove 20, namely above the level of any vertically acting locking surfaces 25. In this case the water-repellent substance 24 is at least provided on the aforementioned contact surface 23 that is located directly under the join of the upper surfaces.

Figure 5:
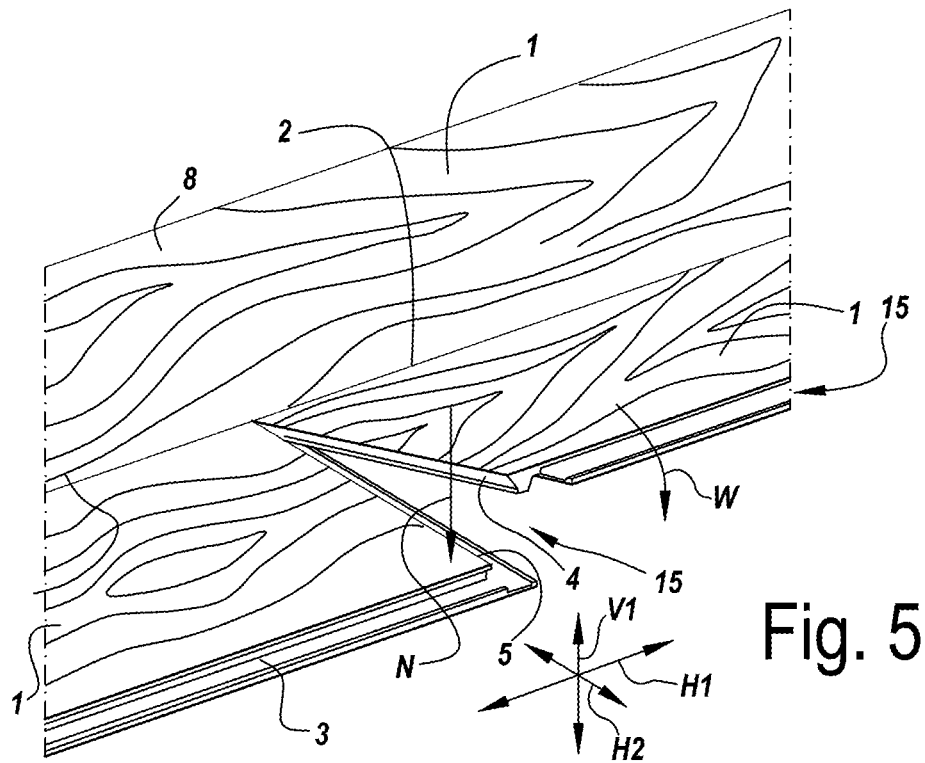
FIG. 5 shows in perspective how the panels from FIGS. 1 to 4 can be assembled to give a floating floor covering.

FIG. 5 shows that the floor panel 1 from FIGS. 1 to 4 is suitable for assembling a floating floor covering. In this case the coupling means 15 on the pair of long edges 2-3 may be coupled to each other by means of a rolling motion W, and the coupling means 15 on the pair of short edges 4-5 may be coupled to each other by means of a downward motion N.

Figure 6:
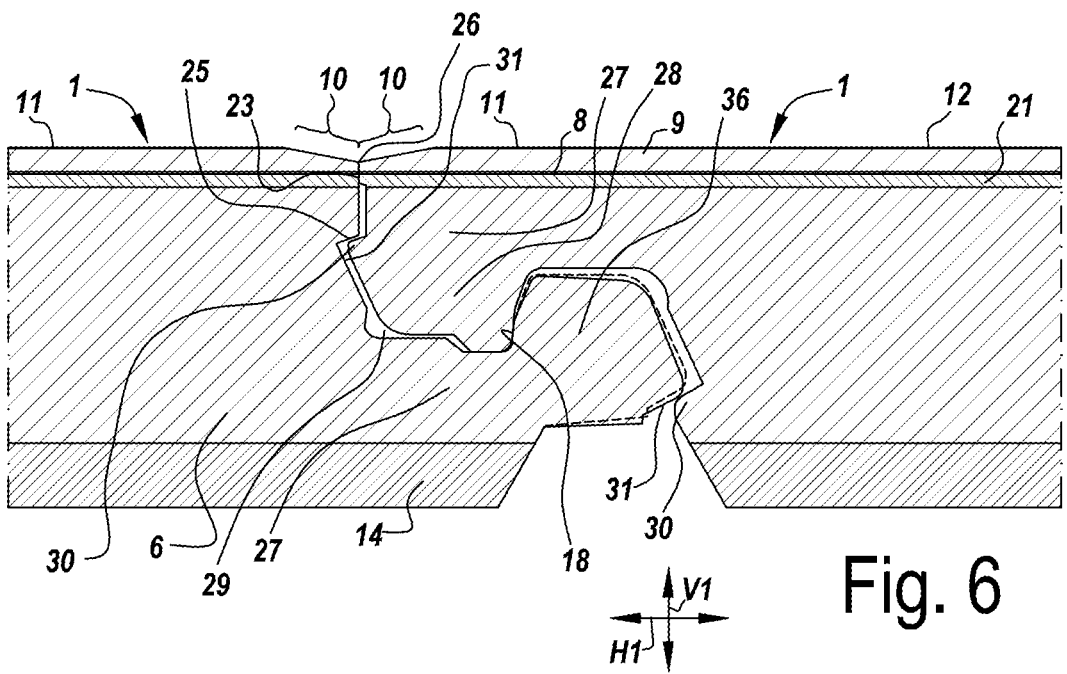
FIGS. 6 and 7 show the coupled state, in a view similar to that in FIGS. 2 and 3.
Figure 7:
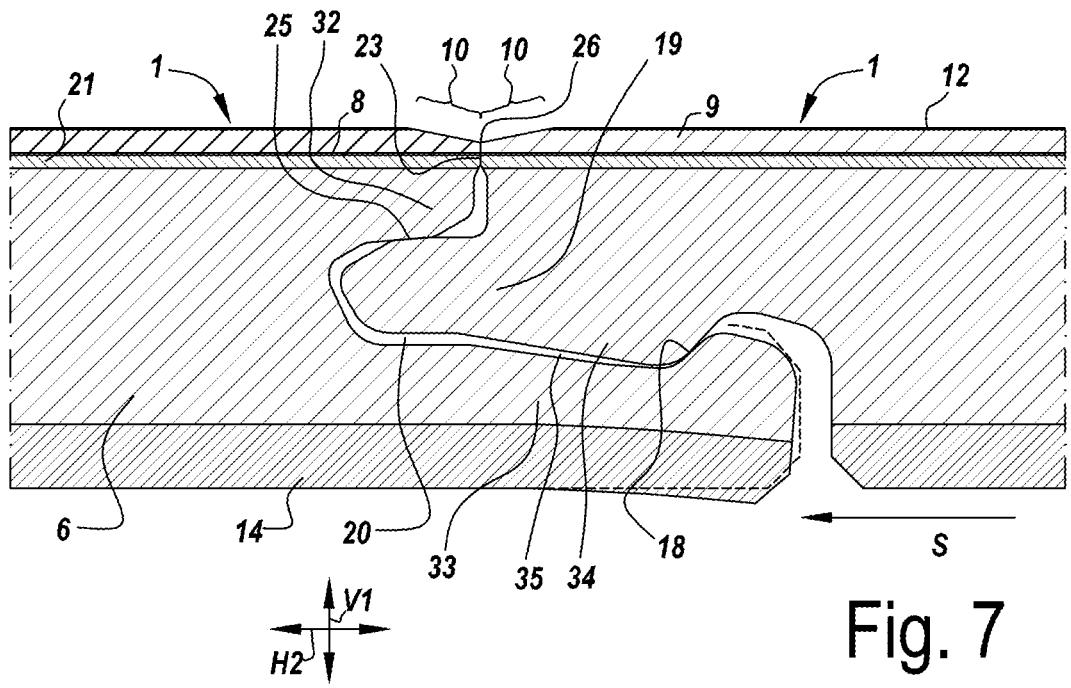

FIGS. 6 and 7 show the coupled state of the coupling means 15 on the pair of short opposite edges 4-5 and the pair of long opposite edges 2-3, respectively. The coupling means 15 and the associated upper edge 26 are produced on the basis of a milling operation with rotating milling tools.

The coupling means 15 on the pair of short opposite edges 4-5, shown in FIG. 6, are configured as a male coupling part 16 and a female coupling part 17, which can be fitted into each other. The male coupling part 16 comprises a hook-shaped portion 27 that projects on the upper side of the panel 1, and the female coupling part 17 comprises a hook-shaped portion 27 that projects on the underside of the panel 1. The hook-shaped portion 27 of the male coupling part 16 comprises a downward projecting locking element 28 that can interact with a recess 29 in the hook-shaped portion 27 of the female coupling part 17. The interaction of the downward projecting locking element 28 and the recess 29 is mainly responsible for the locking in the horizontal direction H1. The hook-shaped portions 27 are further provided with one or more snap portions 30 and undercuts 31 interacting therewith, which provide the locking in the vertical direction V1.

The coupling means 15 on the pair of long opposite edges 2-3, shown in FIG. 7, are, as mentioned above, configured as a tongue 19 and a groove 20, delimited by an upper lip 32 and a lower lip 33. The tongue 19 and groove 20 provide per se the locking in the aforementioned vertical direction V1, and are provided with locking elements 34-35, mainly responsible for locking in the aforementioned horizontal direction H2. The locking elements comprise, in the example, a projection 34 on the underside of the tongue 19 and a recess 35 in the lower lip 33 of the groove 20.

In this case the mechanical coupling means 15 are made with pretension, obtained on the basis of a lower lip bent outwards in the coupled position 33, which in an attempt to spring back, presses against the underside of the tongue 19.

The coupling means 15 shown here also allow coupling based on a horizontal sliding movement S of the panels 1 toward each other.

Also in the example in FIG. 6, a pretension is applied, because a portion 36 of the female coupling part 17 is bent, in this case the upward extending element 36 on the hook portion 27 of the female coupling part 17. In an attempt to spring back, this element 36 presses against the male part 16, more particularly against the downward projecting locking element 28 thereof.

Figure 8:
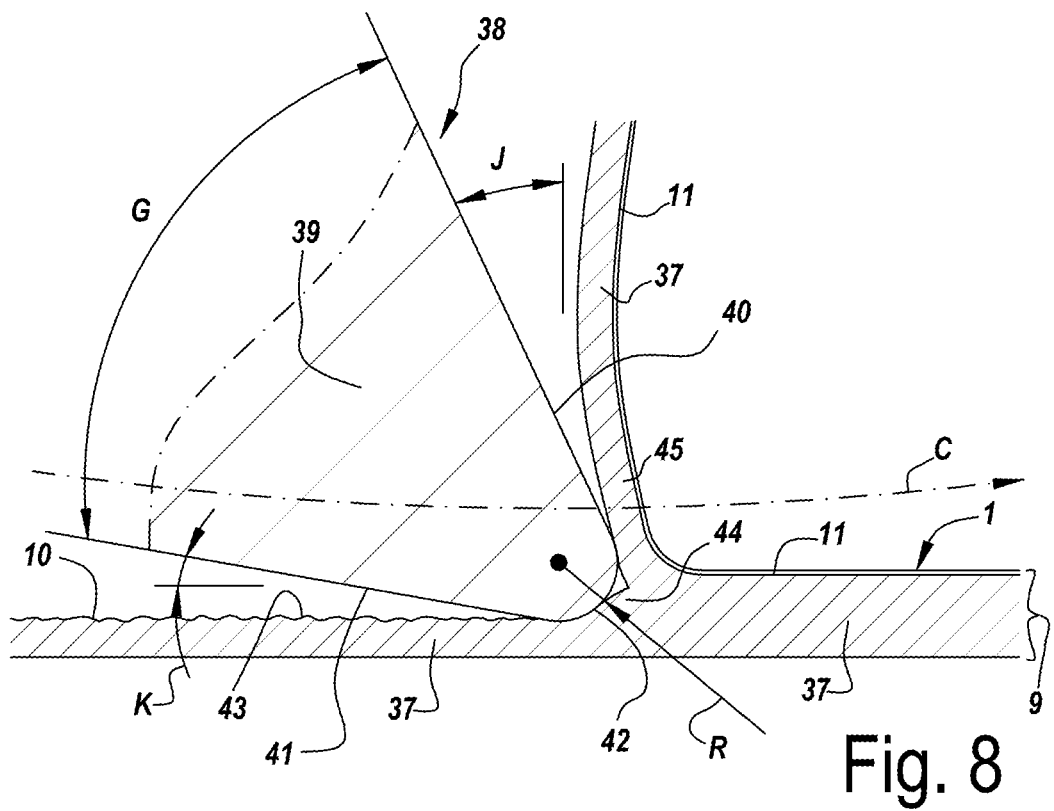
FIG. 8 shows schematically a method for manufacturing the panel from FIGS. 1 to 4, according to a view marked with F6 in FIG. 2.

FIG. 8 shows that the aforementioned lowered edge region 10 is preferably formed by removing a portion of the aforementioned wearing layer 9 on the respective edge 2-3; 4-5. This preferably takes place on the basis of a cutting process with a rotating milling tool 38. The cutting motion C is indicated in FIG. 8 with a chain line. Said milling tool 38 comprises one or more cutting sections 39, preferably at least nine cutting sections uniformly distributed over the circumference of a rotating cutting tool. Preferably the cutting sections 39 comprise a face 40 and a flank surface 41, which are joined to each other by a cutting edge 42, which is provided as a ridge between the face 40 and the flank surface 41. The radius R of the cutting edge 42 is between 2 and 200 μm, preferably between 25 and 100 μm. A radius between 2 and 50 μm also offers interesting possibilities. The wedge angle G between the rake surface 40 and the flank surface 41 is preferably, such as here, less than 80°. The rake angle J is preferably between −15° and 15°, the rake angle J is preferably positive, such as here, and is between 2° and 15°, or better still between 5 and 12°. The clearance angle K is preferably between 0° and 15°, or better still between 0 and 5°.

FIG. 8 shows that the material of the lowered edge region 10 is somewhat compressed and, in this case, also acquires a microstructure 43. The compression occurs mainly in a zone 44 at the location of the cutting edge 42. The relatively blunt cutting edge 42 compresses the material to be cut in the respective zone 44 first, before the chip 45 separates. After cutting, the compressed material may spring back somewhat. The process of compression and springback is uncontrolled and lacks stability. It is this process that gives rise to formation of the microstructure 43 on the surface of the lowered edge region 10, so that a degree of gloss of 10 or less may be obtained. The microstructure 43 is formed by the base material 37 of the wearing layer 9 itself.

It should also be noted that the coated panel 1 from FIGS. 1 to 7 also has the distinctive features of a further independent aspect of the invention, wherein the roughness of the lowered edge region 10 is tailored to the roughness of the surface layer 11 present on the central area 12 of the panel 1. This further independent aspect of the invention is then defined as a coated panel 1 with a substrate 6 and a decorative top layer 7, wherein the aforementioned decorative top layer 7 comprises a print 8 and a transparent wearing layer 9 applied thereon, wherein the transparent wearing layer 9 comprises on the surface a coating or surface layer 11 with a microstructure that has a roughness, wherein the aforementioned panel 1 has a lowered edge region 10 at least on one edge 2-3; 4-5, wherein both the aforementioned print 8 and the aforementioned wearing layer 9 extend continuously from on the central area 12 of the panel 1 over the aforementioned lowered edge region 10, with the distinctive feature that the aforementioned wearing layer 9 is free, at the location of the lowered edge region 10, from the aforementioned coating or surface layer 11, but has a microstructure with a roughness that differs less than 0.5 µm Ra from the roughness of the microstructure of the surface layer 11. It is clear that the microstructure is preferably formed by the material of the surface layer 11 itself, or the base material 37 of the wearing layer 9 itself, and that this microstructure is not pressed through from an underlying layer.

Preferably the roughness of the microstructure of the surface layer 11 is less than 1.5 µm Ra. Preferably the aforementioned roughness defines the degree of gloss of the material in question. This degree of gloss is preferably 10 or less, measured according to DIN 67530.

It is clear that the coated panel 1 of this further independent aspect may also have the distinctive features of one or more of the aspects presented above, or the preferred embodiments thereof, and/or that said panel 1, in particular said lowered edge region 10, may be formed on the basis of the methods that are described above in more detail.

The present invention is by no means limited to the embodiments described above, but said coated panels, methods for the manufacture thereof, and milling tools used therein, may be realized while remaining within the scope of the present invention.

The invention claimed is:

1. A coated panel with a substrate and a decorative top layer forming an upper surface of said coated panel,
    wherein the decorative top layer comprises a print and a transparent wearing layer applied thereon,
    wherein the coated panel has a lowered edge region at least on one edge,
    wherein both the print and the transparent wearing layer extend continuously from on a central area of the coated panel over the lowered edge region,
    wherein the transparent wearing layer comprises a base material and a surface layer with a degree of gloss of 10 or less determined by a microstructure of the surface layer itself,
    wherein the surface of the lowered edge region is formed essentially by the base material;
    wherein the transparent wearing layer has a lower degree of gloss at a location of the lowered edge region than on a central area of the coated panel and/or has a degree of gloss of 10 or less measured according to DIN 67530;
    wherein the degree of gloss at the location of the lowered edge region is defined by a microstructure of the base material itself and wherein the lower degree of gloss is obtained because the transparent wearing layer has a rougher surface structure at the location of the lowered edge region than at the location of an overall surface and/or because the transparent wearing layer is compressed at the location of the lowered edge region.

2. The coated panel of claim 1, wherein the lowered edge region relates to a chamfer,
    wherein the chamfer makes an angle with a horizontal of less than 25°, wherein said horizontal is along a plane parallel to the central area of the coated panel.

3. The coated panel of claim 1, wherein the coated panel is provided on at least two opposite edges with coupling parts that allow two of said coated panels to be coupled together on the respective edges,
    wherein locking is obtained both in a vertical direction perpendicular to a plane of the coupled coated panels, and in a horizontal direction perpendicular to the respective edges in the plane of the coupled coated panels,
    wherein the coupling parts are configured substantially as a male coupling part including a tongue, and a female coupling part including a groove,
    wherein in a coupled state, horizontally acting locking surfaces are formed, which counteract moving apart of the coupled coated panels.

4. The coated panel of claim 3, wherein the substrate comprises several layers,
    wherein a first layer with a first hardness is located between the print and a second layer with a second hardness that is greater than the first hardness.

5. The coated panel of claim 4, wherein in the coupled state of two of said panels, a contact surface arises directly under a joint of the respective upper surfaces of the coupled panels,
    wherein this contact surface is formed mainly, or even exclusively, on the material of the first layer and superjacent layers of the decorative top layer.

6. The coated panel of claim 3, wherein at least one portion of a surface of the coupling parts is provided with a water-repellent substance,
    wherein the water-repellent substance is provided directly under a joint of the upper surfaces of the coupled coated panels, or at the very least in a position above the coupling parts.

7. A coated panel according to claim 1,
    wherein the coated panel is a floor panel,
    wherein the coated panel is provided on at least two opposite edges with mechanical coupling parts that allow two of said coated panels to be coupled together on the respective edges,
    wherein locking is obtained both in a vertical direction perpendicular to the plane of the coupled panels, and in a horizontal direction perpendicular to the respective edges and in the plane of the coupled coated panels,
    wherein the coated panel further has the following combination of properties:
    the property that the coated panel is rectangular, wherein the coated panel is provided both on a pair of long edges and on a pair of short edges with the mechanical coupling parts,
    wherein the mechanical coupling parts on the pair of long edges allow two of said coated panels to be coupled together by means of a rolling motion, and the mechanical coupling parts on the pair of short edges allow two of said coated panels to be coupled together by means of a downward motion;

the property that the mechanical coupling parts, at least on the pair of long edges, and on the pair of short edges, press the coupled coated panels against each other;

the property that a contact surface is formed directly under the position where the upper surfaces of the coupled coated panels join together and that this contact surface is formed mainly, and exclusively, on a first layer of the substrate and the superjacent decorative top layer, wherein the first layer is more flexible than a subjacent second layer of the substrate, wherein both the first layer and the second layer comprise PVC and the first layer of the substrate comprises a higher proportion of plasticizer than the second layer located thereunder;

the property that at least one portion of the mechanical coupling parts is provided with a water-repellent substance; and the property that the transparent wearing layer comprises a thermoplastic wearing layer applied on the print.

8. A method for manufacturing the coated panel in accordance with claim 1, wherein the method comprises the step of forming the lowered edge region by removing a portion of the transparent wearing layer on the respective edge.

9. The method of claim 8, wherein a relevant portion is removed on the basis of a cutting process with a rotating milling tool, wherein the rotating milling tool comprises one or more cutting sections with a rake surface and a flank surface, which are joined to each other by a cutting edge, which is provided as a ridge between the rake surface and the flank surface, wherein a radius of the cutting edge is between 2 and 200 µm, and wherein a wedge angle between the rake surface and the flank surface is less than 80°.

10. The method of claim 9, wherein the one or more cutting sections consist of polycrystalline diamond, and are provided on a hard-metal carrier.

11. The rotating milling tool for carrying out the method in accordance with claim 9, wherein a rake angle is between 5 and 12° and/or a clearance angle is between 0 and 15°.

12. A method for manufacturing the rotating milling tool of claim 11, wherein the method comprises at least the following steps:

the step of providing the one or more cutting sections with the rake surface and the flank surface, which are joined to each other by the cutting edge, which is provided as the ridge between the rake surface and the flank surface, wherein the wedge angle between the rake surface and the flank surface is less than 80°; and the step of processing the one or more cutting sections with an abrasive medium, wherein the cutting edge is provided with the radius of between 2 and 200 µm.

13. The method of claim 12, wherein the one or more cutting sections are provided with the rake surface and the flank surface by means of spark erosion.

14. The method of claim 12, wherein the step of processing the one or more cutting sections comprises immersion thereof in a bath filled with the abrasive medium, and performing a vibrating motion with the bath.

15. The method of claim 12, wherein the step of processing the one or more cutting sections comprises brushing of the one or more cutting sections, based on a brush provided with bristles coated with abrasive particles of the abrasive medium.

16. A coated panel with a substrate and a decorative top layer, wherein the decorative top layer comprises a print and a transparent wearing layer applied thereon, wherein the transparent wearing layer comprises, on a surface, a coating or surface layer with a microstructure that has a roughness, wherein the coated panel has a lowered edge region at least on one edge, wherein both the print and the transparent wearing layer extend continuously from on a central area of the coated panel over the lowered edge region, wherein the transparent wearing layer comprises a base material and a surface layer with a degree of gloss of 10 or less determined by the microstructure of the surface layer itself, wherein the surface of the lowered edge region is formed essentially by the base material, wherein the transparent wearing layer at a location of the lowered edge region is free from the coating or surface layer but has a microstructure with a roughness that differs less than 0.5 µm Ra from a roughness of the microstructure of the surface layer;

wherein a degree of gloss at the location of the lowered edge region is defined by a microstructure of the base material itself.

17. The coated panel of claim 16, wherein the roughness of the microstructure of the surface layer is less than 1.5 µm Ra.

18. The coated panel of claim 16, wherein the roughness determines the degree of gloss of the lowered edge region and the surface layer, and this degree of gloss is 10 or less measured according to DIN 67530.

19. The coated panel of claim 16, wherein both the print and the transparent wearing layer extend continuously from on the central area of the coated panel over the lowered edge region, wherein the transparent wearing layer has a lower degree of gloss at the location of the lowered edge region than on the central area of the coated panel and/or has a degree of gloss of 10 or less measured according to DIN 67530.

* * * * *